Aug. 23, 1949.　　　　　J. AICARDI　　　　　2,479,892
RADIO DIRECTION FINDER
Filed July 3, 1945　　　　　　　　　　　5 Sheets-Sheet 1

Inventor
Joseph Aicardi
By Richard S. Ould
Attorney

Patented Aug. 23, 1949

2,479,892

UNITED STATES PATENT OFFICE 2,479,892

RADIO DIRECTION FINDER

Joseph Aicardi, Versailles, France, assignor to Sadir-Carpentier, Paris, France, a joint-stock company of France Application July 3, 1945, Serial No. 603,046
In France October 27, 1944

8 Claims. (Cl. 343—116)

The present invention relates to a direction finding method and to circuits and apparatus for carrying out the same.

Direction finding methods are already known in which two identical spaced receiving antennae A and B are used.

Said antennae A and B are spaced from each other by a distance which may be designated $2d$.

A transmitted signal coming from a mobile craft having a bearing $\theta$ produces in the two said antennas A and B induced electromotive forces of the form:

$$A \cos\left(\omega t - \frac{2\pi d}{\lambda} \sin \theta\right)$$

and $$A \cos\left(\omega t + \frac{2\pi d}{\lambda} \sin \theta\right)$$

the phase difference between said electromotive forces being:

$$\frac{4\pi d}{\lambda} \sin \theta = \varphi \qquad (1)$$

where $\theta$ is the bearing of the transmitter, that is the angle between the direction of the transmitter and the perpendicular bisector of the line joining the two antennas.

One causes said two electromotive forces having a pulsation $\omega$ to beat with one and the same local electromotive force having a pulsation $\omega'$.

The two beat electromotive forces obtained a frequency $\omega - \omega'$ also have the same phase difference $$\varphi = \frac{4\pi d}{\lambda} \sin \theta$$

between them.

In these prior art systems, the two said electromotive forces having a frequency $\omega - \omega'$ are then opposed in a circuit.

If the two beat electromotive forces are in phase and have the same amplitude, the resulting electromotive force is, of course, zero.

On the contrary, if both electromotive forces produced by the beat have a certain phase difference $\varphi$ between them even if having the same amplitude, the resulting electromotive force will have a certain value which is a function of the phase difference.

Thus, the difference between the two beat electromotive forces $\overline{OA}$ and $\overline{AB}$ can be zero only when said electromotive forces are in phase and have the same amplitude.

Let us suppose that the voltage difference obtained by dephasing one of the electromotive forces by an angle $\varphi$ is zero. The angle $\varphi$ by which said electromotive force has been displaced in phase is necessarily equal to the initial phase difference between the two beat electromotive forces. Accordingly, the bearing $\theta$ of the transmitter can be deduced from the knowledge of said dephasing angle $\varphi$ and from the preceding formula $$\varphi = \frac{4\pi d}{\lambda} \sin \theta$$

However, said methods of the prior art present various inconveniences and more particularly the following ones:

The precise determination of the bearing angle $\theta$ requires that one obtains a resultant which is rigorously zero for the suitable value of the dephasing imposed on one of the electromotive forces. Therefore, it is necessary that the amplitudes of the two electromotive forces present be rigorously equal. Otherwise, the zero is replaced by a more or less broad minimum.

It is desirable to avoid this condition met in these systems of the prior art which it is always difficult to meet in a strict manner.

The present invention has more particularly for its object to remedy this inconvenience.

The present invention first relates to a direction finding method in which the electromotive forces induced by the transmitted signal observed having a pulsation $\omega$ are caused to beat in two antennae A and B with one and the same local electromotive force having a pulsation $\omega'$ and one combines in one and the same circuit the two so obtained beat electromotive forces having a pulsation $\omega - \omega'$ and between which there exists a difference of phase $\varphi$ which is a function of the bearing of the transmitter, this method being characterized in that one periodically reverses the phase of one of said beat electromotive forces so that the amplitude of the resulting combined electromotive force varies at the inversion frequency, the rate of the modulation in amplitude varying with the dephasing and becoming zero for a given dephasing and, accordingly, for a predetermined bearing, this determination which is thus made by a null method being, owing to this fact, independent of the amplitude of the two combined electromotive forces.

The present invention also relates to another method corresponding to the one just mentioned and characterized in that one periodically varies the phase of one of the two beat electromotive forces of frequency $\omega - \omega'$ so that in the course of a period of variation of said phase, the dephasing of the two beat electromotive forces of frequency $\omega-\omega'$ passes thru $$\frac{\pi}{2}$$

or an odd multiple of $$\frac{\pi}{2}$$

that is $$\left[(2n+1)\frac{\pi}{2}\right]$$

the determination of the additional dephasing at this moment, defined by the reduction to zero of the modulation in amplitude of the resulting electromotive force determining the dephasing angle $\varphi$ and, accordingly, the direction of the transmitter the position of which is to be determined.

In a general manner the present invention relates to this method regardless of the particular apparatus used for carrying out the same. However, the present invention also covers apparatus making it possible to carry out the preceding method in a particularly efficacious manner and characterized in that the control station containing the observation apparatus such as a cathode-ray oscillograph, the local oscillator producing the auxiliary oscillation $\omega'$ adapted for beating with the received oscillation $\omega$, and the control panel is located at any point with respect to the antennae A, B, C and D and at any distance from the latter, said arrangement being possible owing to the fact that the measurement is unaffected by the variations of amplitudes, the only shift at the local high frequency $\omega'$ which is necessary comprising no condition of maintaining constant either the amplitude or the phase.

Furthermore, the present invention covers a device for the periodic variation of the phase characterized by network units formed of inductors connected in series and of capacities connected in shunt, or conversely, the inductors or the capacities of each of said units (or both together) being periodically variable within narrow limits, so that the variation of the introduced dephasing is a linear one, the dephasing introduced by the artificial line comprising said units and representing the sum of the dephasings introduced by each of the network units being thus practically linear.

Besides, the present invention covers said device for the periodic variation of phase regardless of the systems in which said device is used.

Also the present invention relates to a method for the obtaining a voltage which is proportional to a dephasing, said method being characterized in that one combines a voltage $\overrightarrow{OA}$ the phase of which is periodically variable, with a voltage $\overrightarrow{BO}$ in quadrature with the mean value of the phase of the voltage $\overrightarrow{OA}$, the variation of amplitude of the resulting voltage $\overrightarrow{BA}$ being thus at every moment proportional to the dephasing when the variation of phase of the voltage $\overrightarrow{OA}$ is small.

The methods and the apparatus used for carrying out the same which make it possible to attain the above mentioned objects have the characteristic features which appear from the following description and more particularly from the appended claims.

The direction finding method and apparatus according to the present invention are shown by way of example in the appended drawings, in which.

Figure 1:
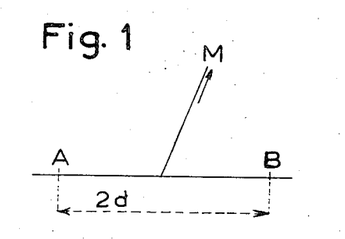
Figure 1 is a view showing the arrangement of the antennae.

According to the method which forms the subject matter of the present invention, one uses as heretofore for reception two antennae A, and B (Figure 1) and one causes the electromotive force induced in each of said antennae A and B and having the pulsation $\omega$ to beat with a local oscillation having the pulsation $\omega'$. The two beat oscillations obtained having the pulsation $\omega-\omega'$ have a phase difference $\varphi$ which is a function of the direction of the transmitter M, as previously indicated.

One then combines the two beat electromotive forces say $\overrightarrow{OA}$ and $\overrightarrow{AB}$ which are thus obtained, by periodically reversing at the frequency $f$ the phase of one of said beat oscillations, as, for instance, $\overrightarrow{AB}$ which at one instant takes the direction which may be designated $\overrightarrow{AB_1}$, then, at the next instant takes the opposite direction $\overrightarrow{AB_2}$, and so on.

Figure 2:
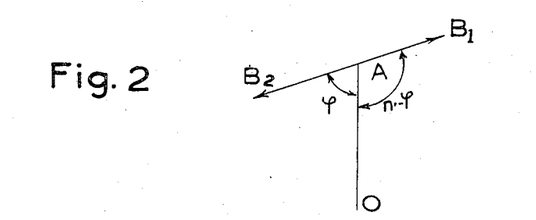
Figure 2 is the vector diagram of two oscillations dephased by any angle $\varphi$.

Then the resulting electromotive force passes at the inversion frequency $f$ from the value $$\overrightarrow{OB_1}=\overrightarrow{OA}+\overrightarrow{AB_1}$$

to the value $\overrightarrow{OB_2}=\overrightarrow{OA}+\overrightarrow{AB_2}$ and so on (Figure 2) where in general $OB_1$ and $OB_2$ are not equal.

The amplitude of the resulting electromotive force is the same in both alternations if the dephasing angle between $\vec{OA}$ and $\vec{AB}$ is equal to $$(2n+1)\frac{\pi}{2}$$

Figure 3:
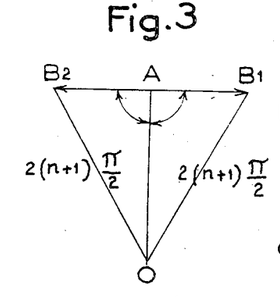
Figure 3 represents the vector diagram of two oscillations dephased by $\pi/2$.

(Figure 3). Indeed, one sees in Figure 3 that $\overline{OB_1} = \overline{OB_2}$ if this particular dephasing relation exists.

Figure 4:
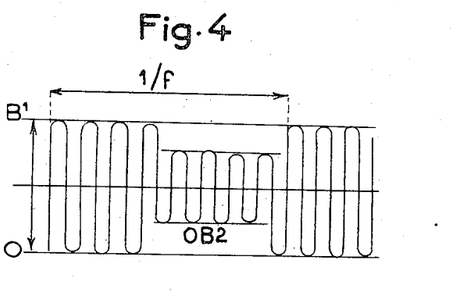
Figure 4 represents the oscillations resulting from the combining of two oscillations having the same frequency and one of which is periodically reversed.

Thus, the resulting electromotive force is generally modulated in amplitude at the inversion frequency $f$ (Figure 4), but the modulation rate is reduced to zero for a dephasing of the two components $\overline{OA}$ and $\overline{AB_1}$, $\overline{AB_2}$ equal to $$(2n+1)\frac{\pi}{2}$$

whatever may be the ratio of the amplitudes.

The dephasing angle $\varphi$ between the two beat electromotive forces can be measured in the following manner: One periodically varies at a frequency $f'$ the phase difference between the two beat electromotive forces of frequency $\omega - \omega'$. Let $\psi$ be the variable dephasing which is thus added for this purpose at every instant to the dephasing angle $\varphi$ of the two beat oscillations of frequency $(\omega - \omega')$ which dephasing angle $\varphi$ is a function of the direction of the transmitter.

The modulation rate of the resulting electromotive force is then zero for a value $\psi_1$ of $\psi$ such that $$\varphi + \psi_1 = (2n+1)\frac{\pi}{2}$$

wherefrom $\varphi$ the phase difference between the beat frequency oscillations and, accordingly, $\theta$ the bearing of the transmitter can be deduced using Equation 1:

$$\sin \theta = \frac{(2n+1)\frac{\pi}{2} - \psi_1}{\frac{4\pi d}{\lambda}} \quad (2)$$

$\sin \theta$ varying from $-1$ to $+1$ it must be possible to vary the dephasing $\psi_1$ from the value $$(2n+1)\frac{\pi}{2} - \frac{4\pi d}{\lambda}$$

to $$(2n+1)\frac{\pi}{2} + \frac{4\pi d}{\lambda}$$

the magnitude of the variation of $\psi_1$ to be obtained $$\pm \frac{4\pi d}{\lambda}$$

increasing, of course, with $d/\lambda$.

One then simultaneously traces, for instance on a cathode-ray oscillograph, the instantaneous values of the variable dephasing angle $\psi_1$ and the corresponding values of the resulting modulation rate or, what is the same, the resulting oscillations which are detected and which have the frequency $f$ of the periodic inversions of the phase of the beat frequency $\overline{OA}$.

The value $\psi_1$ for which the modulation rate at inversion frequency $f$ is zero indicates the value of the complementary dephasing angle $\varphi$ since at that moment $$\psi_1 + \varphi = (2n+1)\frac{\pi}{2}$$

The value of $\psi_1$ being thus known, $\sin \theta$ is deduced therefrom by the formula:

$$\sin \theta = \frac{(2n+1)\frac{\pi}{2} - \psi_1}{\frac{4\pi d}{\lambda}}$$

When the delineation of the dephasing angle is effected on a cathode-ray oscillograph the pair of plates providing the horizontal sweeping is submitted to a voltage which is a function of the variation at frequency $f'$ of $\psi$ starting from its mean value $$(2n+1)\frac{\pi}{2}$$

while the vertical displacement of the spot is produced by the oscillations having the frequency of inversion $f$.

Figure 5:
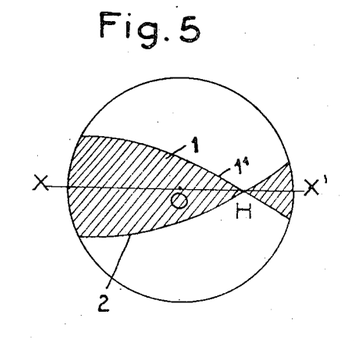
Figure 5 represents the trace obtained in reception on a cathode-ray oscillograph showing phase relations wherein the horizontal sweep frequency is variably de-phased.

Then the screen of the oscillograph shows the trace 1 of Figure 5.

This trace is formed of two envelopes 1' and 2 which are symmetrical with respect to the axis $xx'$ of the screen.

These two envelopes intersect in a point H for which the modulation rate of the oscillations having the pulsation $\omega$, that is to say the amplitude of the oscillations having the frequency $f$, is zero.

The position of the point H with respect to the point 0 which is the centre of the screen, indicates the value of the angle $\psi_1$ and thus the value of the dephasing angle $\varphi$ between the two beat frequency oscillations.

Figure 6:
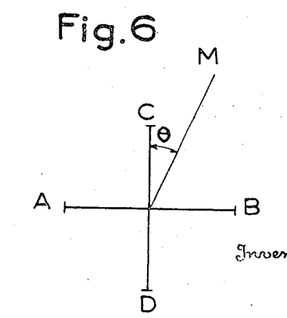
Figure 6 represents the arrangement of the four antennae for carrying out the method according to the present invention.

According to another form of the present invention, the preceding operations are effected together on the two mentioned antennae A and B and also on two other antennae C and D forming with the antennae A and B the corners of a square (Figure 6). One thus obtains in like manner for the two antennae C and D, oscillations having the frequency of inversion $f$ and the amplitude of which is reduced to zero for a value $\psi_2$ of phase angle $\psi$ determining the value of the cosine of the bearing angle $\theta$ according to the formula:

$$\cos \theta = \frac{(2n+1)\frac{\pi}{2} - \psi_2}{\frac{4\pi d}{\lambda}} \quad (3)$$

By applying the voltage which is a function of the variation of the dephasing angle $\psi$ to the pair of vertical plates of the cathode-ray oscillograph, and the voltage having the inversion frequency $f$ to the pair of horizontal plates, one obtains a trace 2 (Figure 7) in which the position of the point G defines $\psi_2$.

Since the mean value of $\psi$ is $$(2n+1)\frac{\pi}{2}$$

the Equations 2 and 3 may be written:

$$\sin \theta = \frac{\lambda}{4\pi d}(\Delta\psi)_1; \quad \cos \theta = \frac{\lambda}{4\pi d}(\Delta\psi)_2$$

or $$\sin \theta = \frac{\lambda}{4\pi d} K.\overline{OH}; \quad \cos \theta = \frac{\lambda}{4\pi d} K.\overline{OG}$$

Figure 7:
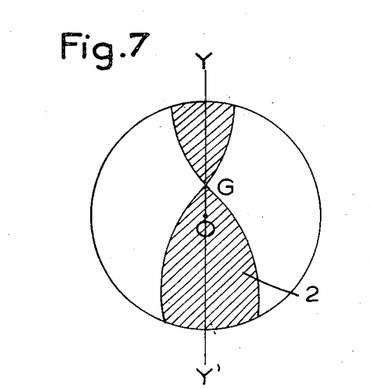
Figure 7 represents another trace obtained in reception on a cathode-ray oscillograph showing phase relations wherein the vertical sweep frequency is variably de-phased.

G being the point of the axis of the screen (with the centre 0) for which the envelope of the oscillations with the inversion frequency $f$ intersects the axis (Figure 7).

Thus, the angle $\theta$ which is the bearing of the transmitter, is given by its sine and its cosine.

These two operations of the antennae A, B and C, D can be combined so as to give a direct reading of the angle $\theta$.

For this purpose, one alternately effects changing over at a frequency $f''$ the operations on the antennae A and B, on the one hand, and C and D, on the other hand, in order successively to obtain, on the screen of the cathode ray oscillograph at a first instant a trace similar to that of Figure 5, and at a subsequent instant a trace similar to that of Figure 7. The trace of Figure 5 gives $\sin \theta$, while the trace of Figure 7 gives $\cos \theta$. This alternation can be effected rather rapidly, for instance by means of an electronic change-over switch, in order that the two traces 1 and 2 may appear to coexist on the screen.

One then reverses with the same change over frequency $f''$ the connection of the deflecting plates of the oscillograph so that in working with the antennae A, B for instance the deviation which is proportional to $\Delta \psi$ is delineated in a direction parallel to the axis YY' of the screen and the oscillations having the frequency $f$ are delineated in a direction parallel to the axis XX' while in the operation of the antennae C and D, the oscillations $f$ are traced in a direction parallel to the axis YY', and the deviation proportional to $\Delta \psi$ is traced in a direction parallel to the axis XX'.

Figure 8:
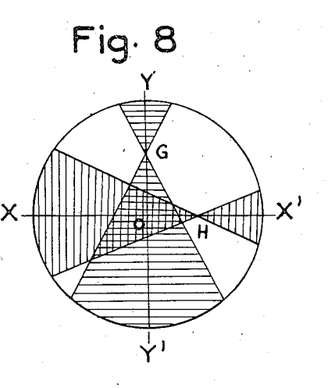
Figure 8 represents the superposition of the two traces of Figures 5 and 7.

Under these conditions one obtains a superposition of the traces 1 and 2 (Figure 8) in which:

$$\sin \theta = \frac{K.\lambda}{4\pi d}\overline{OH}$$

$$\cos \theta = \frac{K.\lambda}{4\pi d}\overline{OG}$$

and where, accordingly, the direction $\overline{HG}$ represents the direction of the transmitter while the direction $\overline{X'X}$ is the origin direction.

For reading the values of the line $\overline{HG}$ and the bearing angle $\theta$ one sweeps over the screen of the oscillograph an orientable reference line 3 passing through the centre 0 of the screen (Figure 8), the periphery of this screen carrying graduations 4 which permit to read the bearing of the transmitter M.

Figures 9, 10, 11:
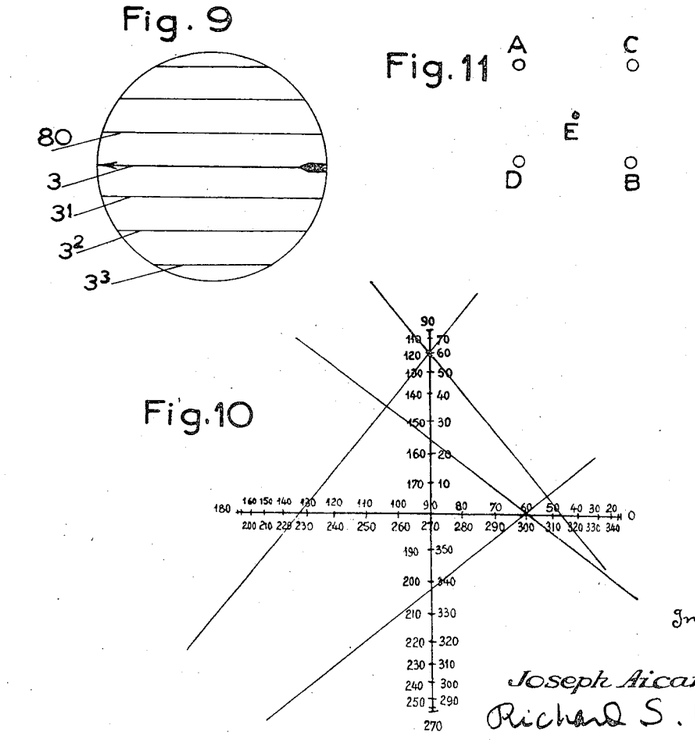
Figure 9 represents a movable superposable screen facilitating the reading of the indications of the oscillograph.
Figure 10 represents a special graduation of the screen of the oscillograph to provide direct reading.
Figure 11 is a plan view showing the arrangement of the five antennae of the antenna system according to the present invention.

This reference line 3 can be traced advantageously on a transparent screen 80 and accompanied by portions of straight lines $3_1$, $3_2$, $3_3$ and so on ..., which are parallel and which will facilitate the directional adjustment of said movable screen about the centre 0 (Figure 9).

With this method the amplitude readings at H and G will always be true zeros, which renders the reading precise.

On the other hand, with this method, it is sufficient that the electromotive force used for the sweeping (which electromotive force is at every moment proportional to the variation of the dephasing imposed on the one of the two beat electromotive forces coming from both antennae), be the same for both oscillograms in order that the direction $\overline{HG}$ be correct.

The absolute value of the sweeping electromotive force does not matter. Likewise, the value of the amplification obtained for the oscillations having the inversion frequency $f$ is without any importance, since only the position of the zero is of consequence.

On the contrary, if one wishes to read on each axis of the screen the value of the sine or of the cosine according to the considered axis of the bearing of the observed transmitter, it is necessary to take into consideration the factor $$\frac{K\lambda}{4\pi d} = \frac{K'}{\omega'}$$

For this purpose, for a given wave length $\lambda$ one arranges a small auxiliary transmitter the bearing of which is known and one adjusts the sweeping voltage so that the indications read on observing said transmitter are correct.

When the wave length of the transmission varies, one causes the sweeping voltage automatically to vary when the received frequency $\omega$ varies and at the same time one varies the frequency of the local oscillation $\omega'$ as a function of the variation of the frequency of the received oscillation $\omega$ in order to maintain constant the beat frequency.

For this purpose, one takes care that the sweeping voltage is mechanically controlled by the control of the variation of the frequency of the local oscillation $\omega'$.

It is then possible to graduate the axes of the screen directly in values of the angle $\theta$ which is the bearing of the transmitter. Of course, on the axis corresponding to $\sin \theta$, one reads at the same point the bearing angles $\theta$ and $180-\theta$ and on the axis corresponding to $\cos \theta$ the angles $\theta$ and $(360-\theta)$.

Thus, one obtains a graduation array like that of Figure 10. One then immediately reads the bearing of the transmitter on the graduations, it is the number read at the same time at the two points where the amplitude of the oscillations is zero being the number 60 in Figure 10.

According to the value of the bearing angle $\theta$, it is on one or the other of the two axes that the precision of the reading is the greatest, the number found on the axis which is less precise serving more particularly to remove ambiguity.

Figure 12:
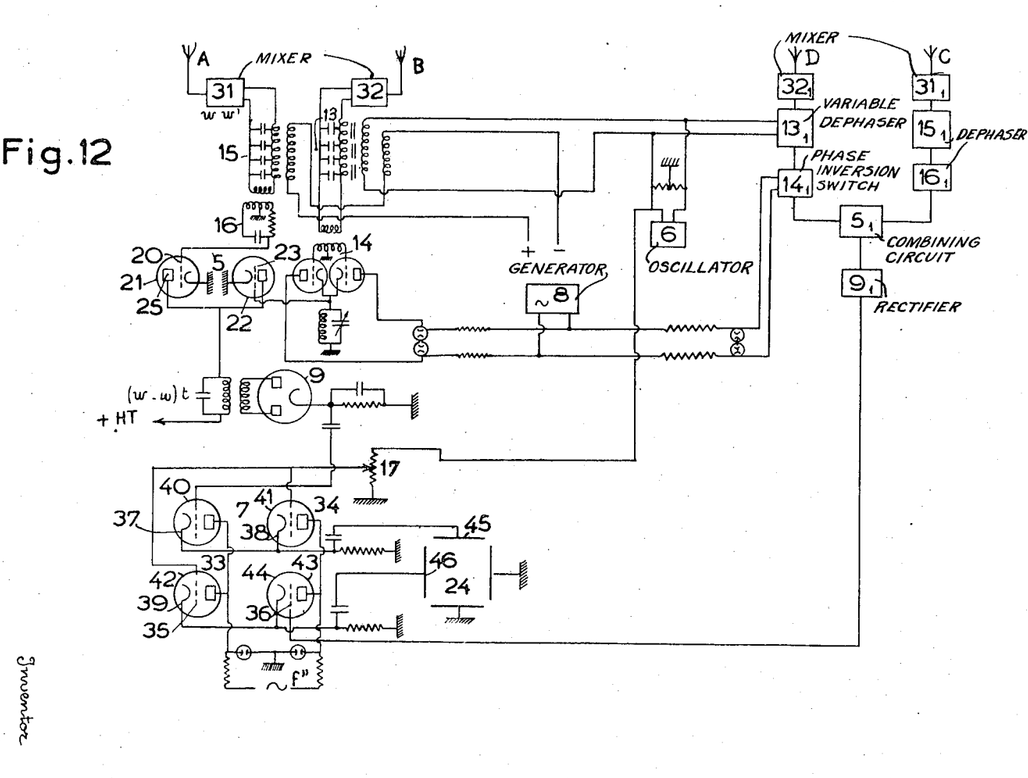
Figure 12 is a circuit diagram of the direction finding system according to the present invention.

Figures 11 and 12 represent a system which is particularly suitable for carrying out the above described methods.

This system comprises four antennae A, B, C, D located on the corners of a square and an auxiliary antenna E placed in the center of said square. This antenna E transmits the local oscillations with the frequency $\omega'$ which are received in agreement of phase by the four antennae A, B, C, D, (Figure 11).

At the foot of the antenna A and B are located the mixer devices 31 and 32 in each of which the beat frequence $\omega - \omega'$ is produced (Figure 12).

The oscillations leaving the mixer 31 of antenna A with the pulsation $\omega - \omega'$ are transmitted thru a fixed dephasing device 15 and a dephaser 16 dephasing by the angle $\pi/2$ to the grid 20 of a triode 21 forming with a triode 22 a combining circuit 5.

Further referring to Fig. 12, the oscillations leaving the mixer 32 of antenna B with the pulsation $\omega - \omega'$ are transmitted thru a device 13 giving a dephasing variable periodically with the dephasing frequency $f'$ to a phase inversion switch 14 reversing the phase at the inversion frequency $f'$. The mean value of the dephasing caused by the variable dephasing device 13 is equal to the value of the fixed dephasing caused by the device 15. The periodic variation of the phase of one voltage of frequency $\omega - \omega'$ having a variable phase is effected, therefore, about a mean value of dephasing differing by $\pi/2$ from the fixed dephasing of the other voltage of frequency $\omega - \omega'$. The oscillations coming from the phase inversion switch 14 are transmitted to the grid 23 of the triode 22 of the combiner 5.

Thus, one obtains on the two parallel mounted plates 25 of the triodes 21 and 22 of the combiner circuit 5, the combination of the two oscillations having the frequency ω—ω'.

The first oscillation of frequency (ω—ω') derived from mixer 31 of the antenna A has a constant phase.

The second oscillation of frequency (ω—ω') derived from mixer 32 of the antenna B has a phase ψ periodically variable at the dephasing frequency f' and reversed at the inversion frequency f, the means value of the phase difference between these two oscillations being equal to the phase difference on the output side of the mixers 31 and 32 increased by π/2.

Preferably, the periodic variation of the phase ψ is at every moment proportional to the voltage V having the dephasing frequency f'.

The variable dephasing circuit 13 is controlled by an oscillator 6 delivering the dephasing frequency f'.

The voltage of said oscillator 6 of frequency f' also is applied to one of the two pairs of the plates of a cathode ray oscillograph 24. Thus, this pair of plates is submitted to a voltage which is proportional to the variation of the dephasing angle ψ.

The other pair of plates of the cathode ray oscillograph receives the resulting oscillations having the frequency f of inversion coming from the combiner 5 and detected by the double diode 9.

These indications derived from signals received by the antennae A and B are completed by the indications derived from signals received by the antennae C and D, a double change-over switch 7 alternately applying to a given pair of plates of the oscillograph at the oscillograph change-over frequency f'', first the voltage having the inversion frequency f coming from the antennae A and B and at the next instant the voltage having the inversion frequency f coming from the antennae C and D.

At these successive instants, one of these voltages is applied to the horizontal plates, and the other to the vertical plates of the oscillograph 24 (Fig. 12).

For this purpose, the antennae C and D are connected with circuits mounted in the same manner as the circuits of the antennae A and B respectively. Thus, at the foot of the antennae C and D are located the mixer devices 31¹ and 31² in each of which the beat frequency ω—ω' is produced.

The oscillations leaving the mixer 31¹ of the antenna C having the frequency ω—ω' are transmitted thru a dephasing device 15¹ for a fixed dephasing, and a dephaser 16¹ producing a dephasing angle of π/2 to the combiner circuit 5¹.

The oscillations leaving the mixer 32¹ of the antenna D with the pulsation ω—ω' are transmitted thru a device 13¹ giving a dephasing periodically variable at the dephasing frequency f' to a phase change-over switch 14¹ reversing the phases at the reversing frequency f. The so periodically reversed oscillations are also transmitted to the combiner circuit 5¹. The resulting oscillations are then detected by the device 9¹.

The variable dephasing circuit 13¹ is controlled by the oscillator 6 working with the dephasing frequency f' which is common to both antenna groups A, B and C, D.

The succession of the images on the screen of the cathode ray oscillograph 24 and their dephasing by π/2 on the screen are obtained by the combination of an oscillator of oscillograph change-over frequency f'' and an electronic change-over switch 7 which is double.

For this purpose, an oscillator 8 applies a voltage of the inversion frequency f to the plate circuits of each of the phase change-over switches 14 and 14'.

Further referring to Fig. 12, the voltage V having the dephasing frequency f' from oscillator 6 is applied thru the medium of the potentiometer 17 to the grids 34 and 35 of the triodes 41 and 42 of the electronic change-over switch 7.

The voltage coming with the inversion frequency f from the detector circuit 9 of the antenna group A, B is applied to the grid 33 of the triode 40, while the voltage coming from the detector 9¹ of the antenna group C, D and having the frequency f is applied to the grid 36 of the triode 43.

The plate voltages of the four triodes 40, 42, on the one hand, and 41, 43 on the other hand, of the double electronic change-over switch 7, are alternately positive and negative at the oscillograph change-over frequency f'' and in opposition of phase.

The cathodes 37 and 38 of the triodes 40 and 41 are connected to the pair of oscillograph vertical plates 45, while the cathodes 39, 44 of the triodes 42 and 43 are connected to the pair of horizontal plates 46 of the cathode ray oscillograph 24.

Under these conditions, during an alternation lasting $$\frac{1}{2f''}$$

second, the triodes 40 and 42 the anodes of which carry a positive voltage transmit the oscillations of frequency coming from detector circuit 9 to the pair of plates 45, and the voltage having the dephasing frequency f' to the pair of plates 46 respectively, thus giving the trace with a horizontal axis characterizing the reception of the antennae A and B (Figure 5).

During the subsequent alternation of the same duration of the frequency f'', the triodes 40 and 42 cease to operate, while the triodes 41 and 43 the anodes of which carry a positive voltage transmit respectively the oscillations coming from the detector circuit 9¹ of inversion frequency f to the pair of plates 46 and the voltage with the dephasing frequency f' to the plate 45 respectively, thus giving the trace with a vertical axis characterizing the reception on the antennae C and D (Figure 7).

The observer who simultaneously observes the two so obtained traces determines therefrom the direction of the transmitter, as already indicated.

Figure 13:
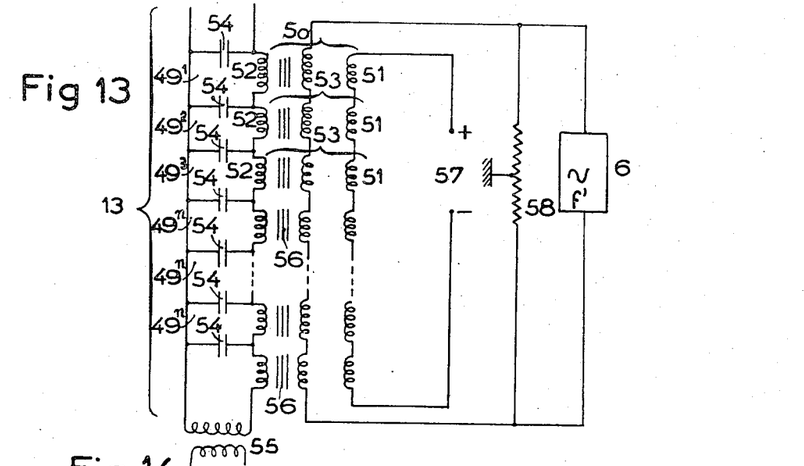
Figure 13 is a circuit diagram showing an artificial line with a variable dephasing.

The periodically variable dephasing device 13 or 13¹ operating at the dephasing frequency f' can in general be a device of any kind. It can be advantageously formed of an artificial line constituted of a series of network units 49¹, 49², 49³, ... 49ⁿ (Figure 13).

Each unit is, for instance, a π network unit formed of one of the windings 52 of a transformer 50 with three windings 51, 52 and 53 and also of condensers 54.

The last unit is terminated on a transformer 55 for coupling with the output circuit to inverting switch 14.

The other two windings 51 and 53 of each transformer 50 are connected in series respectively.

The windings 51, 52 and 53 of each transformer 50 are wound on an iron core 56 or on a core made of compacted iron powder.

The windings 51 which are connected in series are connected with an electric source of direct current 57.

The windings 53 connected in series are connected with the source or oscillator 6 of frequency $f'$ also delivering to an output resistance 58 the mid point of which is grounded.

The variable dephasing device 13 of Fig. 13 works as follows:

Each network unit 49 introduces into the artificial line a dephasing which is a function of the value of the self-inductance of the windings 52, the dephasage of the line being the sum of the dephasings introduced by each unit 49.

The winding 51 thru which the direct current flows fixes the mean value of the self-inductance 52 on a suitable portion of the magnetization curve, so that on both sides of said mean value the variation of the self-inductance is proportional to the variation of the current at least for small values of this variation.

The winding 53 thru which the alternating current having the dephasing frequency $f'$ flows, varies the self-inductance values of the windings on both sides of the mean value defined by the value of the direct current which flows thru the windings 51. Thus, one obtains an artificial line in which the variation of the phase is the sum of the phase variations of each unit 49. Thus, said variation of phase is proportional to the alternating current flowing thru the windings 53 with a frequency $f'$.

The artificial line 15 or 15' introduced into the circuit receiving the oscillations of the antennae A or C, is identical with the previously described dephasing artificial line 13, but there is applied thereto no alternating voltage. Thus, with the arrangement of Fig. 13, the dephasing introduced by the two artificial lines 13 and 15 between the currents which flow thru the same is due only to the voltage having a dephasing frequency $f'$ applied by the osillator source 6 to the alternating winding 53 of dephaser 13 so long as the variations of the direct current are not excessive.

Figures 14, 15, 16:
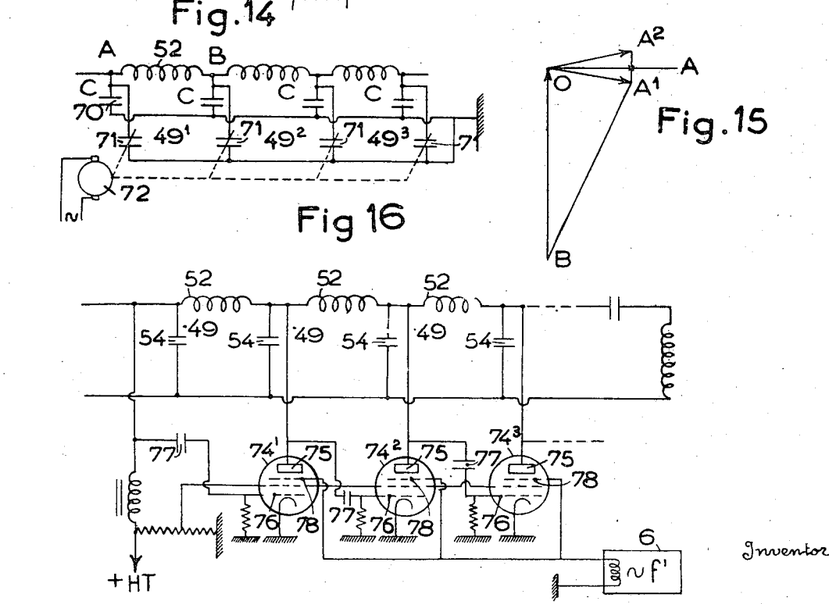
Figure 14 represents another form of an artificial line with a variable dephasing.
Figure 15 represents the vector diagram of the oscillations the resultant of which gives a voltage the variation of the amplitude of which is proportional to a value of dephasing.
Figure 16 is a circuit diagram of a third form of artificial line with a variable dephasing.

According to another form of embodiment, the device for the periodic variation of phase operating at the dephasing frequency $f'$ can be obtained in the following manner (Figure 14).

The dephasing artificial line is again formed of a series of network units 49. These units are, for instance, $\pi$ network units with inductance coils 52 connected in series and with capacities connected in shunt. Each of said capacities is formed of a fixed capacity 70 and of a variable capacity 71 connected in parallel with the capacity 70. One periodically varies all the variable capacities 71 in the same manner by gang control as by coupling their rotors, for instance, with a motor 72.

In order to obtain, for the sweeping of the oscillograph, a voltage which is at every moment proportional to the dephasing which is produced, one can still combine the periodically dephased tension $\overline{OA}$, by any method, between the two extreme positions $\overline{OA^1}$ and $\overline{OA^2}$ with a voltage $\overline{BO}$ in quadrature with the mean position of $\overline{OA}$. The variation of amplitude of the resulting voltage $\overline{BA}$ is at every moment proportional to the dephasing when the angle $A^1 OA^2$ is small (Figure 15). If the variation of phase is obtained, for instance, by the rotation of variable small capacities 71 in parallel with the fixed capacities 70 of the retardation line (Figure 14) the voltage is combined at B, on the output side of the first network unit $49^1$ with a voltage in quadrature with the mean voltage at B (for instance the voltage at A if the units 49 are quarter wave units). A sufficient number of units are connected in series for simultaneously meeting the conditions: a variation of phase which is very small for each network unit and a total variation of phase which is sufficiently high.

It is also possible to adopt the phase variation device of Figure 16.

This device is formed of network units 49 connected in series with an inductance coil 52 and a capacity 54. Each of said units dephases on a mean value $\pi/2$. Variable reactance valves $74^1$, $74^2$, $74^3$ have their anodes connected with the input of each network unit 49 while their control grid 76 is connected thru a capacity 77 with the input of the preceding unit. Therefore, the current flowing thru each variable reactance valve is dephased by $\pi/2$ with respect to the voltage of the anode. Owing to this fact, each variable reactance valve $74^1$, $74^2$, $74^3$ varies the equivalent capacity of each unit 49 by a quantity which is proportional to the voltage V applied to the grid 78 of each tube 74 so long as this variation is sufficiently small.

For obtaining a periodic variation of phase each grid 78 is connected with an oscillator 6 operating with the dephasing frequency $f'$. Owing to this fact, the variation of phase is proportional to the voltage supplied by the oscillator 6.

Figure 17:
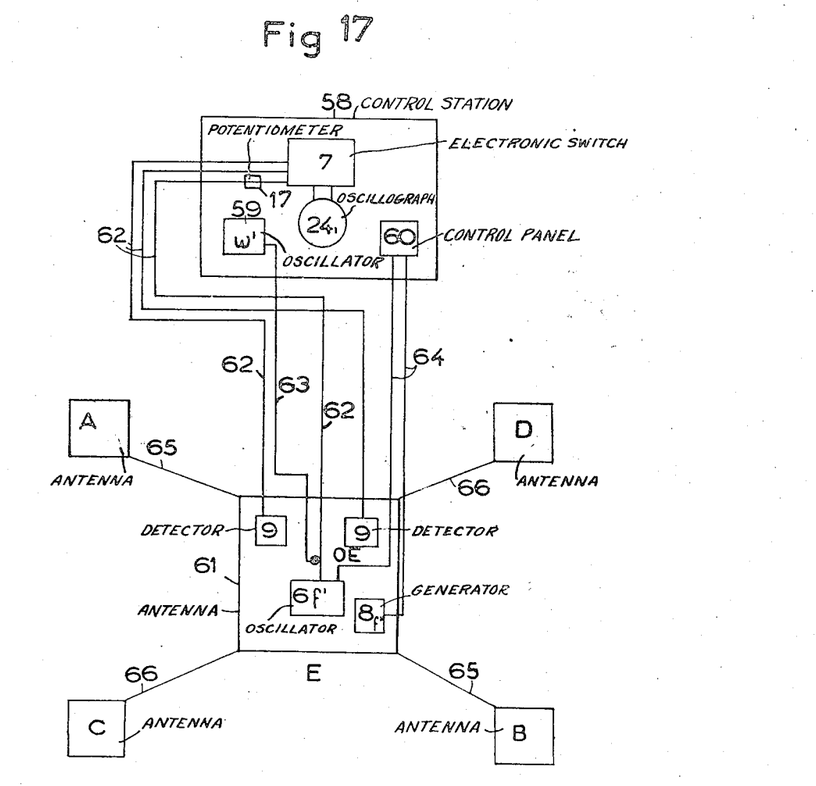
Figure 17 is a block diagram showing the arrangement of the various units of the system of Figure 13.

The various parts of the above described direction finding system can advantageously be arranged in the following manner (Figure 17).

The control station 58, which can be considerably spaced from the antennae A, B, C, D, comprises the electronic change-over switch 7 with a cathode ray oscillograph 24, the oscillator 59 producing the oscillations $\omega'$ and the control panel 60, and serving also for starting the whole receiving system (oscillators $f$ and $f'$, amplifiers and the like), as well as a remote control device for the tuning of the antennae and of their receiver; said tuning need not be very precise. It can be obtained, for instance, in a discontinuous manner provided that for each position of adjustment the circuits are tuned on the same frequency for all the receivers. Thus, with identical receiver circuits, no error of phase is introduced by adjustment differences.

The only precise adjustment to be effected is that of the local frequency $\omega'$. This is very easy, the oscillator being placed in the control station.

At the foot of each of the four antennae A, B, C, D (or even in a place in the centre of the square), is located a detector device 31, 32 (Fig. 12) which supplies and, if necessary, amplifies the oscillations having the frequency $\omega-\omega'$ produced by beating with the signals received on that antenna. According to the method of the present invention, these devices can have without any inconvenience very different amplifications.

The only condition to be met by them is that they must behave in the same manner as regards the dephasing of the oscillations $\omega-\omega'$, i. e. of the beat oscillations. This condition is the more easily to be met the smaller $\omega-\omega'$ is.

The other elements such as the phase change-over switches 14 and 14' (Fig. 12), the combiner circuits 5 and $5^1$, the detector circuits 9 and $9^1$, the oscillators for the frequency $f$ and for the frequency $f''$, and the oscillator 6 for the frequency $f'$, are located in an enclosure 61 located at the center of the square formed by the four antennae A, B, C, D (Fig. 17).

The control station 58 is connected with the enclosure 61:

(a) Thru conductors 62 carrying the oscillations having the inversion frequency $f$ and a variable amplitude coming from the detector circuits 9 and 9¹, and the voltage having the dephasing frequency $f'$ supplied by the oscillator 6;

(b) By a line 63 delivering to the auxiliary antenna E in the center of the square formed by the antennae, the oscillations having the frequency $\omega'$.

The control panel 60 is connected with the enclosure 61 by conductors 64.

Lines 65 and 66 transmit the currents having the frequency $\omega-\omega'$ between the enclosure 61 and the antennae A, B and C, D respectively.

The lines 65 which carry the currents having the frequency $\omega-\omega'$ from the antennae A and B to the center are identical and have the same length. The same is true for the connections 66 between the center and the antennae C and D. Thus, no interference dephasing is introduced by these connections.

Thus, said arrangement makes it possible to control the system from a station lying at any distance from the antenna.

Numerous modifications can be applied to the above described plant without departing from the scope and spirit of the invention.

For instance, in case of the reception of variable wave lengths, it may be desirable to cause the sweeping voltage automatically to vary when the received frequency varies.

For this purpose, one modifies the frequency of the oscillation having the frequency $\omega'$ and beating with the received oscillation, so as to maintain constant the difference $\omega-\omega'$, and one adjusts the potentiometers 17 so as to vary the voltage according to the received frequency and according to a suitable law.

For this purpose, one can mechanically connect the control of the oscillation having the pulsation $\omega'$ with the control of the potentiometer 17. This is easy, since the oscillator 6 and the potentiometer 17 are both in the control station 58.

I claim:

1. In a radio direction finding system, a pair of spaced receiving antennas, a local oscillator, individual mixing means connected to each of said antennas and picking up respectively the local oscillations from said local oscillator to produce a first and a second beat oscillation of the same beat frequency but having a phase difference, phase adjusting means for adjusting the phase of one of said beat frequency oscillations, inverting means connected for periodically inverting by 180° at an inverting frequency the phase of one of said beat oscillations, combining means for combining said two beat frequency oscillations after said phase adjustments, detecting means for detecting the output of said combining means and detecting out said beat frequency, and measuring means for measuring the phase of the point of zero amplitude modulation at said inverting frequency of the output of said detecting means as a measure of the difference of phase of the initial dephasing of the signals received in said two antennas.

2. In a radio direction finding system, a pair of spaced receiving antennas, a local oscillator, individual mixing means connected to each of said antennas and picking up respectively the local oscillations from said local oscillator to produce a first and a second beat oscillation both of the same beat frequency but having a phase difference, means for fixedly adjusting the phase of said first beat oscillation, means comprising an oscillator source of adjusting frequency for periodically varying at an adjusting frequency the phase of said second beat oscillation, inverting means connected for periodically inverting by 180° at an inverting frequency the phase of said second beat oscillation after its said variation at said adjusting frequency, combining means for combining said two beat frequency oscillations after their phases have been so modified, detecting means for detecting the output of said combining means and detecting out said beat frequency, and a cathode ray oscillograph having two pairs of plates, one of said pairs of plates being connected to the output of said detecting means, and the other of said pairs of plates being connected to said adjusting frequency oscillator source, whereby the zero axis intercept of the trace on said cathode ray oscillograph is a measure of the initial dephasing of the signals received in said two antennas and the bearing of the transmitting source.

3. A system according to claim 2, said means for periodically varying at an adjusting frequency the phase of said second beat oscillation further comprising a plurality of capacity and inductance filter network units whose inductances are saturable ferromagnetic reactors adapted for periodic saturation by the output of said oscillator source of adjusting frequency.

4. In a radio direction finding system, two pairs of spaced receiving antennas respectively positioned on opposite corners of a square, a local oscillator, mixing means connected to each of said antennas and picking up respectively the local oscillations from said local oscillator to produce for each said pair of antennas a first and a second beat oscillation of the same beat frequency but of different phases, individual means for fixedly adjusting the phase of the first beat oscillation derived from each of said pairs of antennas, individual auxiliary means for periodically varying at an adjusting frequency the phase of the second beat oscillation derived from each of said pairs of antennas, said last mentioned auxiliary means comprising a common oscillator source of adjusting frequency connected to both of said auxiliary means for varying the phase of both of said second beat oscillations, individual inverting means for each of said pairs of antennas connected for respectively periodically inverting by 180° both at the same inverting frequency the phase of the second beat oscillation derived from each of said pairs of antennas after its said variation at said adjusting frequency, individual combining means for each said pair of antennas for combining respectively said two beat frequency oscillations derived from both of said pairs of antennas after their phases have been so modified, individual first and second detecting means for detecting the output of each of said combining means and detecting out the said beat frequency therefrom, a cathode ray oscillograph having two pairs of plates, and a cyclic oscillograph change-over switch operating at an oscillograph change-over frequency within the persistence of vision and adapted to and connected for connecting cyclically at a first instant, a first one of said pairs of plates to said first detecting means, and said second pair of plates to said adjusting frequency oscillator source, and at a subsequent instant connecting said first pair of plates to said adjusting frequency oscillator source and said second pair of plates to said second detecting means, whereby the zero axis intercepts of the traces on said cathode ray oscillograph are a measure of the initial dephasing of the signals received in said two pairs of antennas and the bearing of the transmitting source.

5. A system according to claim 4, said means for periodically varying at an adjusting frequency the phase of said second beat oscillation for each of said pairs of antennas further comprising for each of said pairs of antennas a plurality of capacity and inductance filter network units whose inductances are saturable ferromagnetic reactors adapted for periodic saturation by the output of said oscillator source of adjusting frequency.

6. A system according to claim 4, said means for periodically varying at an adjusting frequency the phase of said second beat oscillation for each of said pairs of antennas further comprising for each of said pairs of antennas a plurality of capacity and inductance filter network units whose inductances are saturable ferromagnetic reactors adapted for periodic saturation by the output of said oscillator source of adjusting frequency, and each of said saturable reactors further comprising a separate direct current saturating winding and an adjustable source of direct current connected to each of said direct current saturating windings for adjusting the steady value saturation of said reactors.

7. In radio direction finding employing a pair of spaced receiving antennas, the method of getting a sharp visual direction indication which consists in beating the high-frequency signals received on each of said antennas with a local oscillation to derive therefrom two beat oscillations of the same frequency but different phase, varying the phase of a first one of said beat oscillations by a fixed phase difference, varying the phase of the second of said beat oscillations periodically at an adjusting frequency, periodically inverting by 180° at an inverting frequency the phase of the said second beat oscillation after said earlier modification of its phase, combining both of the so modified beat oscillations, detecting the so combined beat oscillations to detect out the beat frequency, tracing visually the output of said detecting means against said adjusting frequency as a base, and reading the zero axis intercept of said trace as an indication of the direction of the transmitter of the signals received.

8. In radio direction finding employing two pairs of spaced receiving antennas respectively positioned on opposite corners of a square, the method of getting a sharp visual direction indication which consists in beating the high-frequency signals received on each of said antennas with a local oscillation to derive therefrom two pairs of beat oscillations of the same frequency but different phase, varying the phase of a first one of said beat oscillations of each of said pairs of oscillations by a fixed phase difference, varying the phase of the second one of said beat oscillations of both of said pairs of beat oscillations at the same adjusting frequency, periodically inverting by 180° at a common inverting frequency the phase of the second beat oscillation of each of said pairs of beat oscillations after said earlier modification of their respective phases, separately combining the two so modified beat oscillations of each of said pairs, separately detecting the so combined respective pairs of beat oscillations to detect out the beat frequency, and cyclically tracing successively at a change-over frequency which is within the persistence of vision two traces, the first said trace representing the resultant of detecting the combined said first pair of oscillations displayed as ordinates against said adjusting frequency displayed as abscissae, and the second said trace representing the said adjusting frequency displayed as ordinates against the resultant of detecting the combined said second pair of oscillations displayed as abscissae, and reading the zero axis intercepts of said two traces as an indication of the direction of the transmitter of the signals which are being received.

JOSEPH AICARDI.

REFERENCES CITED

The following references are of record in the file of this patent:

UNITED STATES PATENTS

| Number | Name | Date |
|---|---|---|
| 1,968,068 | Blancard et al. | July 31, 1934 |
| 2,007,099 | Usselman | July 2, 1935 |
| 2,160,135 | Fritz | May 30, 1939 |
| 2,232,592 | Davies | Feb. 18, 1941 |
| 2,408,121 | Wirkler | Sept. 24, 1946 |
| 2,408,122 | Wirkler | Sept. 24, 1946 |